(12) United States Patent
Engdahl et al.

(10) Patent No.: US 8,387,153 B2
(45) Date of Patent: Feb. 26, 2013

(54) COMMUNICATION ARRANGEMENT

(75) Inventors: Christer Engdahl, Särö (SE); Torbjörn Andréasson, Hisingsbacka (SE); Martin Fröjd, Mölndal (SE); Martin Jigstam, Mölndal (SE); Björn Mattiasson, Kungsbacka (SE); Annika Sörfeldt, Hisings Kärra (SE); David Täng, Onsala (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 253 days.

(21) Appl. No.: 12/812,888

(22) PCT Filed: Dec. 1, 2008

(86) PCT No.: PCT/EP2008/066539
§ 371 (c)(1),
(2), (4) Date: Jul. 14, 2010

(87) PCT Pub. No.: WO2009/092483
PCT Pub. Date: Jul. 30, 2009

(65) Prior Publication Data
US 2011/0119768 A1    May 19, 2011

Related U.S. Application Data

(60) Provisional application No. 61/022,850, filed on Jan. 23, 2008.

(51) Int. Cl.
*H04N 7/16* (2011.01)
(52) U.S. Cl. .......................................................... 726/27
(58) Field of Classification Search ..................... 726/27
See application file for complete search history.

(56) References Cited

U.S. PATENT DOCUMENTS

| 7,331,059 B2* | 2/2008 | Sameshima et al. ............. 726/7 |
| 7,515,717 B2* | 4/2009 | Doyle et al. .................. 380/277 |
| 2007/0101435 A1* | 5/2007 | Konanka et al. ................ 726/27 |
| 2011/0247083 A1* | 10/2011 | Flaks et al. .................... 726/28 |

FOREIGN PATENT DOCUMENTS
WO    WO 0150755 A    *  7/2001

OTHER PUBLICATIONS

Razavi et al., "Supporting Selective Information Sharing with People-tagging", Apr. 2008, ACM, pp. 3423-3428.*

* cited by examiner

*Primary Examiner* — Matthew Smithers

(57) ABSTRACT

The present invention relates to a method, node and system for efficient handling of sharing a set of data and in particular where the data set is shared in a volatile manner. Each node with access to the data set sharing group controls the access of data set from the node and each node stores data set received from other nodes in the group in a volatile manner providing removal of data set received from a node that has left the sharing group.

14 Claims, 6 Drawing Sheets

COMMUNICATION ARRANGEMENT

This application claims the benefit of U.S. Provisional Application No. 61/022,850, filed Jan. 23, 2008, the disclosure of which is fully incorporated herein by reference.

TECHNICAL FIELD

The present invention relates to a solution for facilitating information sharing between members of a group and in particular for sharing sensitive information.

BACKGROUND

In many situations where people of organizations collaborate there is a need for sharing information between them; however, there may in some circumstances be legislative restrictions on how to share information, for instance relating to different governmental organizations and sharing of sensitive information. In some circumstances the organizations may not share information since there are security and/or privilege restrictions relating to the information available for each organization: for instance the fire department does not have automatic access to police information. However, in some situations it would be beneficial for all members of a group comprising entities from different organizations to have access to classified information, e.g. in a disaster or accident situation different organizations cooperate to solve the situation (police, fire department, ambulance department, and so on).

Today most collaboration and information sharing is done in meeting rooms or in a command and control (C2) vehicle relating to rescue operations.

In inter-agency collaboration, it is a common situation that there is information that would be helpful to share between parties, but there are some obstacles preventing information sharing from taking place, at least in digital form.

The reason may be, for example:
Legislation does not allow sharing of information
Information are intended for different purposes, making it
  conceived as unsuitable for sharing
  unsuitable form
  "secret" content
Each agency "owns" their own information; business models that support sharing are lacking
  the owning agency demands high economical compensation
  the owning agency reluctant to share information due to competition about funding etc.

This may lead to that information, even if it may be vital to an operation, is only shared "off-the-record" or not shared at all.

Lack of technical support prevents information sharing from taking place. Information sharing that does take place cannot be disseminated effectively and may be distorted. Further, sharing is not traceable in later analysis.

SUMMARY

It is an object of the present invention to provide a solution that may remedy at least some of the problems in known solutions.

There are at present no technical support for "temporary sharing" of information. Information is either not shared at all or only shared orally (avoiding transfer between information systems), and often "off-the-record".

The need for volatile information sharing is identified as a solution that enables organizations like Police and Rescue Service to share information in an application for volatile information sharing.

The purpose of the invention is to facilitate limited information sharing in the sense that information objects (files, images etc.) are made temporary available to collaborating parties under full control of the information owner.

The information owner controls when, to whom, and for how long the information is shared.

The intention is that information objects shall not be transferred in un-encrypted form to the information systems of the collaborating parties but only viewed within a digital whiteboard session.

The invention is intended to support collaboration between trusted partners—facilitating agreements among the parties to share information without permanent hand over of digital information.

The invention comprises technical support for temporary sharing of information:
  Access to shared information is authorized only to participants of a digital whiteboard session.
  The shared information is only accessible for a limited time—decided by the information owner
    the information owner can terminate access to information at any time
    information is available as long as the information owner is participant of the digital whiteboard session or, if actively chosen by the information owner, the information may be available for a certain time interval after the information owner leaves the digital whiteboard session
  While the shared information is accessible there is support for avoiding unauthorized storing or further transfer of information
  After access to information is terminated, it is not possible to recover any un-encrypted information This may be implemented by a software solution that provides access to information objects on "a digital whiteboard" which
  allows management of authorization of whiteboard participants
  allows management of temporal access period
  helps participants to avoid (unwilling) unauthorized storing or further transfer of information
  removes all un-encrypted information after the access period The invention may be implemented by combining the following technical functions: Information infrastructure including security mechanisms
  1. Whiteboard session management
    Invitation of participants to a whiteboard session
    List of participants in a current whiteboard session
  2. Whiteboard style file-sharing with special functions and properties for volatile file-sharing The solution according to the present invention is implemented in a number of aspects in which a first is a communication node handling sharing a set of data. The node comprises a processing unit, at least one memory unit, and a communication interface. The processing unit is arranged to transceive the data set using the communication interface and store received data set in the memory unit. The processing unit is further configured to: set privileges for accessing the data set for use in data sharing group provided by communication node to a second node of the data set sharing group; transmitting data set to a node with appropriate access privileges in the data set sharing group; store data set received from the second node in the data set sharing group in a volatile memory unit. In one embodiment the data set is stored in the volatile memory unit in encrypted form. In one embodiment the data set is communicated encrypted. The processing unit is further configured to communicate with other nodes in a peer to peer manner. In one embodiment the processing unit may further be configured to communicate with a central service with control messages for starting a group session. The processing unit may further be arranged to send join messages to other nodes. The processing unit may further be arranged to send join request messages to nodes participating in an established group session. According to one embodiment, the processing unit may further be arranged to send address information to other nodes listening in the network. According to one embodiment a control message is sent to other nodes in the data set sharing group indicating cancelling data set received from the communication node and/or to periodically send or receive control messages indicating the presence of nodes in the data set sharing group. In one embodiment the processing unit is further arranged to block storage of the data set in a non-volatile memory.

According to another aspect of the invention a method of sharing a set of data in a network is provided. The method comprises the steps of: providing access to one or several nodes to a data set sharing group by a decision in one established member of the data set sharing group; determining access privileges of the data set to be shared to the data set sharing group; sending information to members of the data set sharing group; receiving information from members of the data set sharing group. The received information is stored in a manner so as to prevent non-volatile storage of the data set.

According to another aspect of the invention a system for sharing information, comprising: at least one user node for wireless communication with an infrastructure network and at least one central service located in a packet based network. The user node is arranged to communicate with the central service to receive information of available information sharing groups, to communicate in a peer to peer manner with other user nodes connected to the information sharing group, sharing information to nodes with appropriate access privileges in the information sharing group, and the user node further arranged to store received information in a volatile memory and where the central service provide information about connectivity to members of the information sharing group. The user node may be arranged to start an information sharing group and to inform the central service about the information sharing group and control data related to joining the information sharing group.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

Figure 1:
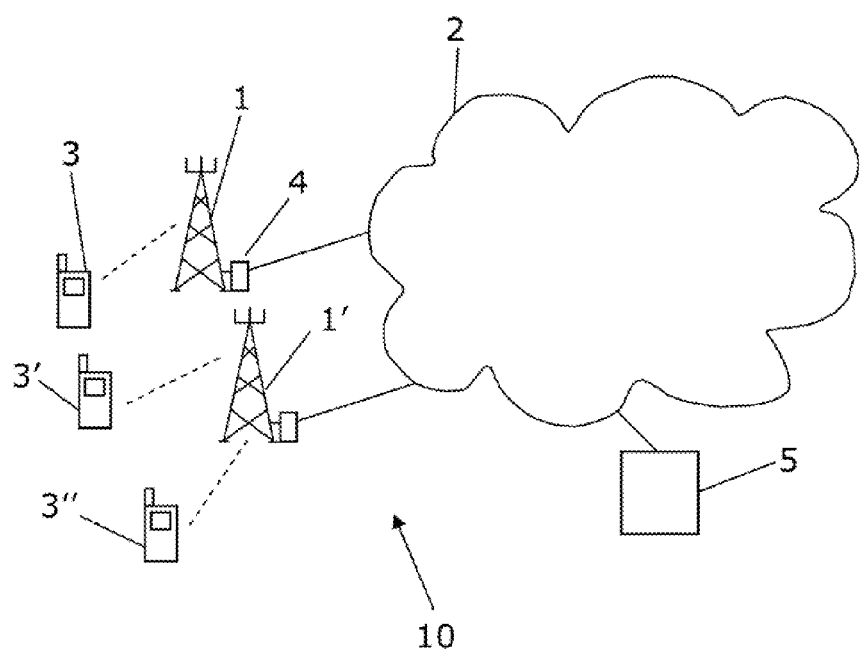
FIG. 1 illustrates schematically a network and system according to the present invention.

In FIG. 1 reference numeral 1 and 1' generally indicate a wireless communication base station or similar wireless access gateway (e.g. access point) to an infrastructure communication network 2. The base station 1 is arranged to communicate wireless with user equipment 3, 3', and 3". Each base station also comprises a radio controller 4 for controlling the wireless communication and for controlling communication with the infrastructure network 2; it should be understood that the radio controller may be incorporated into the base station or act as a separate entity depending on communication protocol used. The base station 1, 1' may furthermore comprise a plurality of antennas and/or a plurality of base stations may be controlled by the radio controller 4. User equipment UE 3, 3', and 3" may communicate with the base station. The base stations or wireless gateways 1, 1' may be using different radio protocols and/or different communication operators. Each UE may operate independently of each other with respect to radio communication protocol. According to the present invention, the UEs may communicate with each other in a sharing configuration using the infrastructure network 2 and forming a sharing group together for a specific purpose.

It should be understood that the number of base stations or wireless gateways and UEs are not restricted to the number shown in FIG. 1 but may be of any number depending on the members of the sharing group.

A central server and/or database unit 5 may optionally be used according to the present invention, wherein the central unit is arranged to relate UEs to each other in the sharing group and provide accessibility to each other and acting as an address lookup facility.

Figure 2:
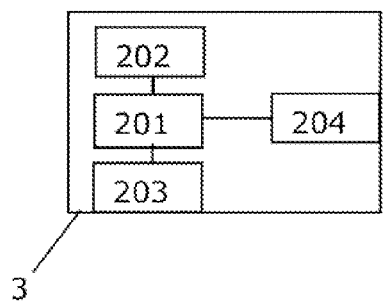
FIG. 2 illustrates schematically a device implemented according to the present invention.

In FIG. 2 a device 3 (user equipment) UE implementing the solution according to the present invention is shown. The device may comprise at least one processing unit 201, at least one memory unit 202, a user interface unit 204 and at least one communication interface 203. The processing unit is arranged to run software or hardware code for communication control and data traffic. The processing unit 201 may comprise a microprocessor, an ASIC (application Specific Integrated Circuit), a Digital signal processor (DSP), an FPGA (Field programmable gate array), or any other suitable type of processing unit capable of running software or hardware instructions. The memory unit 202 may comprise any suitable type of memory (volatile and/or non-volatile) such as e.g. RAM, ROM, EEPROM, Flash, and hard disk. The communication interface 203 connects the device 3 to the infrastructure network 2. It should be understood by the skilled person that other communication equipment may be present as well depending on the type of wireless communication protocol/standard used. The communication unit 203 is arranged to operate at least one wireless communication protocol, for instance using one of GSM, GPRS, UMTS, WLAN, dedicated rescue radio protocols, and so on.

The present invention uses a communication model, where information is shared between members of a sharing group for a time controlled by each user. Each user controls the accessibility of his/hers given information; i.e. who can access his/hers information, optional specified time length of access to the information (lease time), when it is withdrawn from access, and so on as will be discussed in more detail below.

In one embodiment OpenSIS is used for creating the framework of this invention: OpenSIS is a SOA (Service Oriented Architecture) framework for secure collaboration, developed as a concept to show Network Based Defense in action. It enables business components to handle heterogeneous middleware technologies as communications solutions.

The main purpose to use OpenSIS in this implementation of a volatile whiteboard application may be that:
It has a dynamic service discovery.
It has a roll based authorization.
Easy to develop secure service collaboration
Service description language
Application assembly capabilities (MMI SitSyst Model)
System assembly capabilities (SoS SitSyst Model)

User authentication may be carried out with authentication tokens. In one embodiment proprietary certificates may be used as tokens, but one may use any suitable authentication tokens type e.g. X.509 certificates, Kerberos tickets, SAML assertions or some other equivalent method. The private keys according to the present invention are stored on local disk in encrypted files using the PBE with MD5 algorithm, but one may use any suitable algorithm e.g. AES, 3DES or some other suitable algorithms. The secret part (e.g. the private keys, passwords, biometric templates etc) of a token may be stored on a smartcard or a USB token or any other suitable removable storage device. For the authentication part SHA1 with RSA may be used as the signature algorithm, but one may use any other suitable algorithm, e.g. ECDSA, NONE with DSA.

There exist many other platforms that are possible to use as a baseline for developing a volatile whiteboard application. For example:
3. A collection of tools from the Web Service world
4. CORBA with security enabled and some additional services
5. Microsoft .NET (trade mark of Microsoft)
6. JXTA
7. JAVA
8. Any suitable programming tool such as C++
9. Etc Each user node is connected to a communication network (e.g. a packet or circuit switched based network) which in turn may be connected to an IP based network. Through the communication network and possibly an additional data grade network the nodes are interconnected with each other. However, in order to find each other the nodes need to be aware of each other for instance by getting access to each others network addresses.

There are several different implementations for connecting to a group session:
1. Physical interchange of addresses to members of a Peer to Peer group.
2. Central physical person dispatching and controlling connections to suitable group, e.g. central rescue organization.
3. Central service 5, database and/or server, organizing active groups and presenting available groups to authorized potential group members.

In the first case, authorized personal at a geographical location may physically (verbal or written form) exchange communication address information with each other for connecting to the group (set up by one of the members, preferably the first to arrive at the location).

In the second case, a centrally located person (for instance a person operating a central command and control service: e.g. an emergency call center) may initiate the setup of a group for a certain situation and handle dispatching of addresses to authorized users and providing access to the group. This may for instance be done for each time a situation arises that potentially demands the cooperation between several types of organizations.

In the third case, the central service is arranged to handle control of groups, whereby any authorized user may start a group by communicating with the central service. Subsequent users may be connected to the group by finding the group from the central service and connecting to it.

A combination of these three methods may also be used depending on the situation.

Several security levels may be set, depending on type of configuration, for controlling access to information, e.g. who has access to what type of information and how information is stored at each user's equipment. For instance highest level requires all data to be encrypted when stored in a memory thus preventing the use of certain applications (e.g. Microsoft Word or similar standard applications), whilst lower levels may allow for unencrypted data to be temporarily stored in each authorized device thus providing use of other applications in the system (e.g. Microsoft Word or similar standard applications).

The security levels may also be used for determining who has access, e.g.:
1. Highly authorized members only
2. Rescue services and highly authorized members.
3. The above and journalists.
4. Publicly available information.

Nodes in this solution may be a computer or similar device with processing capabilities and communication interface (e.g. laptop, desktop, PDA, mobile phone, smart phone, or proprietary processing system) running the Volatile Information Sharing software. However, no particular hardware is required as long as the hardware can handle suitable software for participating in a group session.

The model according to the present invention describes the methods and underlying principles that encompass the concept of Volatile Information Sharing (VIS). It describes how information sharing groups are created and maintained, how users enter and leave the groups and how we prevent unintentional information sharing.

The first underlying principle of VIS is that information is connected to the user sharing it and only exists as long as the supplying user allows it to. This is the base for the volatile aspect.

The second underlying principle is that each group node (referring to the software, not the user) is responsible for keeping its state up to date and verifying the existence of its peers. Periodically trying to send synchronous "alive" messages to members of the group will tell which member applications are functional and for those that are not any longer functional (present) information will be cleared. Moreover, letting each individual node retrieve the information that is necessary for that specific node helps control bandwidth use as, for instance, unneeded files are not necessary to retrieve if on a slow connection. This principle comes to good use considering a heterogeneous hardware environment with everything from mobile phones on GPRS to powerful desktop computers on high-speed cable connections all in the same group.

The third underlying principle is that the VIS session is under collective ownership and based on trust. Each user can invite new users and no specific user can end the session. The session ends when there are no more active users. Since all members of the group are expected to share information willingly it is important to keep the notion that all members are present on equal terms. The shared information is under the control of the supplying user, whereas it is only the session itself that is collectively owned.

The VIS model is a peer-to-peer network which facilitates users to easily and securely send information to only select users in a group if needs be; however, a central service may be used in some implementations for maintaining an address database for being able to connect to each other. Each user may be connected to their own infrastructure network in turn being in connection to a central network (e.g. the Internet or a common communication network shared by possible members of the group).

The VIS model allows for heterogeneity when it comes to the tools used to share information. It is not necessary (from a technical standpoint) that all users in the group have the same ways to communicate. The users bring the tools they have at their disposal to the group (announcing which tools they have upon joining the group). All users may have chat and file sharing possibilities but not the possibility to use a shared GIS (geographical information system) drawing tool. The limitation can for instance depend on hardware limitations (e.g. processing or user interface graphics limitations) of the UE, communication bandwidth, or lack of tool access.

In the following, the operation of one exemplary embodiment of the VIS application is described from a VIS model point of view. The steps taken to prevent unintentional information sharing will also be described. With the term User is meant human interaction and Node is meant actions initiated by the software.

Once a user starts the application it will produce an "invitable" OpenSiS service making its presence known to others in the network (for instance by sending a message to the central service coordinating the group service) and making it a candidate to be invited into groups. It is possible to be in several groups at once. With term "inevitable" is meant able to be invited.

A user can decide to start a new group and invite users to it. While the group session is active each node investigates the presence of its members and takes action accordingly. In this implementation OpenSiS is used for a secure channel (e.g., using SSL) that is used for distributing group maintenance data and sending information between peers in the group in a secure way.

Figure 4:
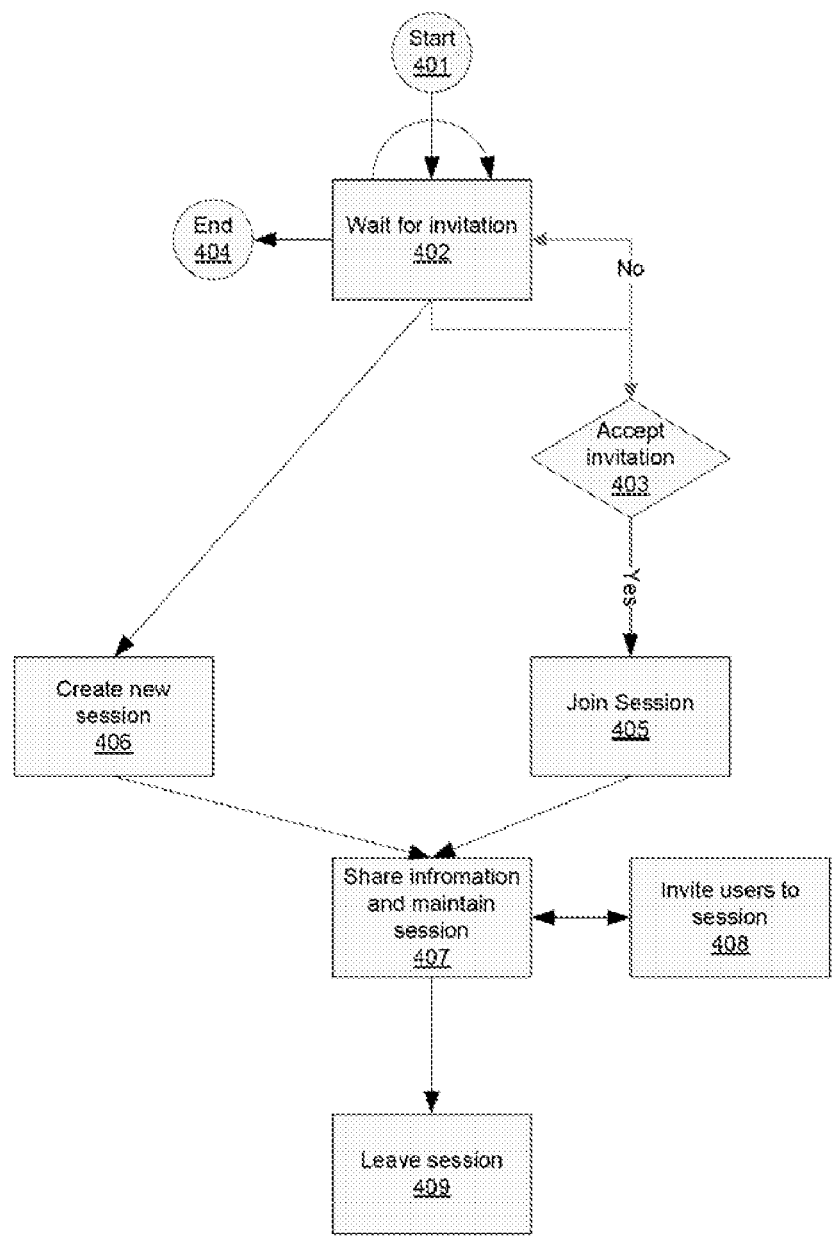
FIG. 4 illustrates schematically a method of managing a session according to the present invention.

When the user leaves the group (either willingly or due to an error) the information shared by that user is withdrawn from all other nodes unless the user has specified an lease time for the information in which case the information is allowed to remain until the lease expires. FIG. 4 illustrates some of the activities and state changes that are possible during a VIS session.

401 Application is started
402 The user waits for invitation
403 A decision for accepting the invitation is received
404 The application is ended if no invitation received
405 The session is joined if invitation accepted
406 A new session is created
407 The information is shared and session is maintained
408 Users are invited to the session
409 A user leaves the session When a user decides to create a new group session a unique group identity needs to be created. The identity is sent to invitees when they are invited to join the group and used as a pass key to be allowed to enter; this is illustrated in FIGS. 5 and 6.

Figure 5:
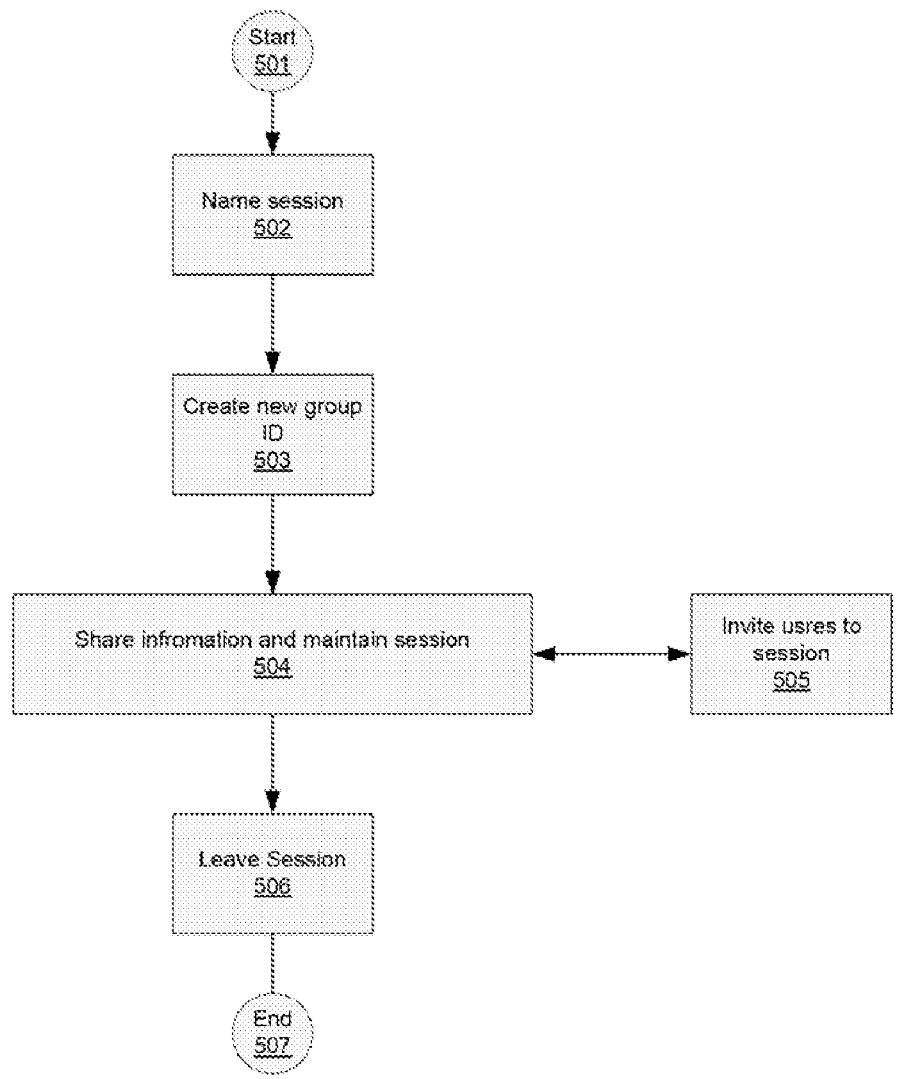
FIG. 5 illustrates schematically a method for creating a new session group according to the present invention.

In FIG. 5
501 The application is started
502 A name session is started
503 A group ID is created
504 The information is shared and session is maintained
505 Users are invited to the session
506 A user leaves the session
507 The application is terminated As mentioned earlier this implementation uses OpenSiS to supply a secure channel on which we can distribute the group identity to the invitees in a secure way. It should be understood that there are several other solutions for distributing the group identity as discussed earlier: for instance physical exchange, central dispatch person, and/or central service.

In FIG. 5 is shown one possible way of creating a new group: A user, node, or central service names the session appropriately and a new group ID is generated. During setup of the new group one may set privileges for sharing information, for instance for information from a particular user and/or for accessing in general. This may be set automatically depending on the situation requiring a new group or may be set for each new group and it may be changed during the session.

Figure 6:
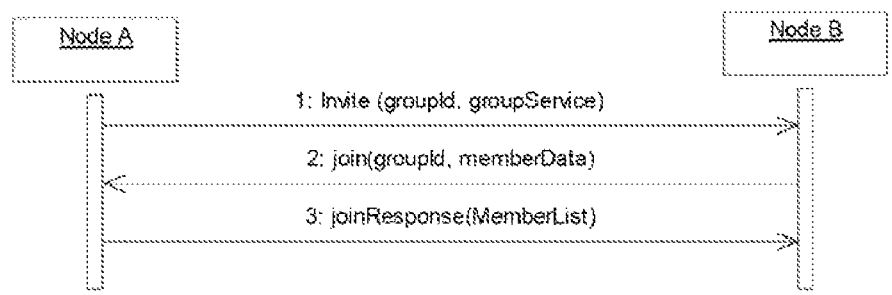
FIG. 6 illustrates schematically a method for inviting a new user in a session group according to the present invention.

Referring to FIG. 6, when Node A wants to invite Node B an invite request is sent over the secure channel to the "invitable" service produced by B. The secret group identity and a reference to the running group (e.g. an OpenSiS service) to which B is invited to join are supplied.

If B decides to join a synchronous join request is sent to the group service supplying the group identity to prove that an invitation was received and member data describing which communication tools the user has and the location of the group service produced by B. Node A responds with the member data for the rest of the members in the group. B then continues to send join requests to the rest of the group.

A user may also send a request to a group or group member to be allowed access to the group and if one member or a central service permits this, the user may get access to the group.

It should also be noted that one may invite a new member to the group even if that node does not have a specific application running used for sharing information: The node or user may be notified using other means, such as SMS (Short Message Service), email, or other communication solutions.

The management of a session means dealing with users joining and leaving and verifying the availability of all known peers.

Availability verification is done by periodically trying to call their synchronous alive method. If no response is received after a specified number of times (configurable) the peer is considered to no longer being available and the solution takes action accordingly. Preferably, an application level availability check is used since a node may be answering to a lower-level call even though application is unavailable.

Users can use a number of tools to share information in the group: chat, file sharing, drawing on shared surface (whiteboard), geographic information on a map and so on. All information sharing is done over a secure channel supplied by the framework, e.g. OpenSiS, and all information needed to be stored locally on disk is encrypted. Information is decrypted only when it needs to be viewed, and then only temporarily.

It is possible for a user to specify a lease time for information contributed to the group. The lease time specifies for how long after the user leaves the group (willingly or due to an error) that the information remains available. As long as the user remains in the group it is possible to set lease time, remove and modify lease time, for information shared by the user.

When a user decides to leave a group it invokes "leave" on each of its peers to notify them and let them take action.

A special case of leaving is when a node looses connection with (parts of) the group due to network issues. The peers who can connect to each other continue to exchange information while information connected to unreachable nodes is cleared or remains for a specified time depending on the way it was introduced. This is in effect a group split.

When the application is terminated each open session is left and all locally stored information is cleared before shutting down.

The Volatile Information Sharing model assumes that users invited into groups are allowed to access the information shared therein. In order to help prevent unintentional information dissemination a number of steps are taken:

Preferably data is to be stored in a volatile memory only; however,

Data that needs to be stored on disk is encrypted using an encryption algorithm, e.g. a symmetrical AES 128-bit crypto with a session-unique key. It should be understood by the skilled person that the encryption algorithm, key length, and method may be varied: for instance in some applications the same key may be used for several sessions.

Information for which one may use an application-internal viewer to open one only need to decrypt into memory and never write decrypted information to disk. For highly secure applications one may want to prevent writing on disk in case of full memory/cache.

If a third-party tool is needed to view the information a temporary decrypted read-only file is created and there may be a process that constantly monitors if it is being used and removes it when the application is closed. Special care needs to be taken when removing the unencrypted temporary files since it is possible to recover information deleted from a hard drive if not removed properly.

The software running the solution according to the present invention may be arranged to monitor operating system (OS) activities in order to detect storage of information on a non-volatile memory for some reason and arranged to hinder the storage into this type of memory. For instance if the volatile memory is full, some OS tries to store data temporarily on a non-volatile memory (e.g. hard disk).

The application may be arranged to allow for permanent storage of information, but this need to be restricted relating to what information and in what circumstances. However, in situations governed by legislation there might be demands on traceability and thus the solution according to the present invention may be arranged so as to provide each node with a file with information about the history of how information has been available and who has had access to it. By combining historic information from each user participating in the group it is possible to at a later stage recreate the configuration and information available during the session.

Figure 3:
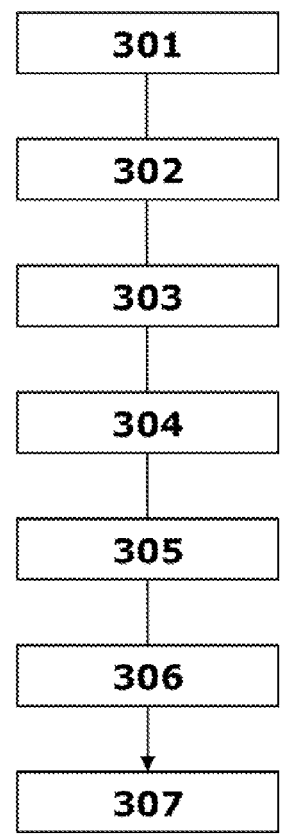
FIG. 3 illustrates schematically in a block diagram a method according to the present invention.

FIG. 3 summarizes a method according to the present invention, where in step:

301. One node initiates forming an information sharing group.

302. The node initiating the group sends control messages relating to identifying the node, the group, and contact data for connecting to the group.

303. The node listens for potential group members and receives join requests or sends join messages from/to available nodes.

304. Transmits information to other nodes members of the group.

305. Receives information from other nodes members of the group.

306. Sends and receives control messages indicating the presence of nodes in the sharing group.

307. Removes information received from a node if there is an indication that node has left the information sharing group.

The solution according to the present invention may at least in part be implemented as software or hardware instructions operated in processing units: part of the instructions operate in each node participating in the information sharing group and/or part may be operated in a central service. Together these may form a system for volatile information sharing.

Even though the present invention has been exemplified using rescue services it may be applicable in other situations or applications where it is of interest to share information in a volatile manner, e.g. between social services or other governmental organizations. Furthermore, private organizations, companies, or even private groups may benefit from use of the invention.

The term whiteboard as used in this application concerns an application or arrangement for sharing information, i.e. several users may add, view, delete, etc. common information. The term information as used in this application concerns a set of data, which in some application may constitute a visual and/or audio context for one or several users.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent embodiments should be apparent for the person skilled in the art.

The invention claimed is:

1. A communication node handling sharing a set of data, said node comprising a processing unit, at least one memory unit, and a communication interface, wherein said processing unit is arranged to transceive data using said communication interface and store received data in said memory unit, where said memory unit is a volatile memory unit and said processing unit is further configured to:
   set privileges for accessing data for use in a data sharing group, which data is provided by said communication node to a second node of said data set sharing group;
   transmit said data to said second node with appropriate access privileges in said data set sharing group; and
   store data received from said second node in said data set sharing group in said volatile memory unit.

2. The communication node according to claim 1, wherein said data is stored in said volatile memory unit in encrypted form.

3. The communication node according to claim 1 wherein said data is communicated encrypted.

4. The communication node according to claim 1, wherein said processing unit is further configured to communicate with other nodes in a peer to peer manner.

5. The communication node according to claim 1, wherein said processing unit is further configured to communicate with a central service with control messages for starting a group session.

6. The communication node according to claim 5, wherein said processing unit is further arranged to send join messages to other nodes.

7. The communication node according to claim 5, wherein said processing unit is further arranged to establish a group session.

8. The communication node according to claim 1, wherein said processing unit is further arranged to send address information to other nodes listening in a network.

9. The communication node according to claim 1, wherein said processing unit is further arranged to send a control message to other nodes in the data set sharing group indicating cancelling data set received from said communication node.

10. The communication node according to claim 1, wherein said processing unit is further arranged to periodically send or receive control messages indicating a presence of nodes in said data set sharing group.

11. The communication node according to claim 1, wherein said processing unit is further arranged to block storage of said data in said non-volatile memory.

12. A method of sharing a set of data in a network, the method comprising the steps of:

providing access to one or several nodes to a data set sharing group by a decision in one established member of said data set sharing group;

determining access privileges by said established member of data to be shared to said data set sharing group;

sending information from said established member to members of said data set sharing group; and receiving information at said established member from members of said data set sharing group;

wherein said information is stored in a manner so as to prevent non-volatile storage of said data set.

13. A system for sharing information, comprising:

at least one user node for wireless communication with an infrastructure network; and at least one central service located in a packet based network;

said user node being arranged to communicate with said central service to receive information of available information sharing groups, communicate in a peer to peer manner with other user nodes connected to said information sharing group, share information to nodes with appropriate access privileges in said information sharing group, and store received information in a volatile memory and wherein said central service is arranged to provide information about connectivity to members of said information sharing group.

14. The system according to claim 13, wherein said user node is arranged to start an information sharing group and to inform said central service about said information sharing group and control data related to joining said information sharing group.

* * * * *